(12) United States Patent
Heinonen

(10) Patent No.: US 7,312,813 B1
(45) Date of Patent: Dec. 25, 2007

(54) WIRELESS APPLICATION PROTOCOL TELEVISION

(75) Inventor: Pekka J. Heinonen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/503,362

(22) Filed: Feb. 14, 2000

(51) Int. Cl.
*H04N 7/18* (2006.01)

(52) U.S. Cl. .................................................. 348/158

(58) Field of Classification Search ............... 348/158, 348/423.1, 425.1, 699, 230; 345/326, 327; 455/3.04, 3.06, 414, 437, 432, 557, 436, 455/442, 550, 556, 440, 11.1, 5.1, 73, 457, 455/33.1, 49, 53.1, 54.1, 99; 370/310, 313, 370/328, 401; 382/232, 236, 238, 233
See application file for complete search history.

(56) References Cited

U.S. PATENT DOCUMENTS

| | | | | | |
|---|---|---|---|---|---|
| 5,333,177 | A | * | 7/1994 | Braitberg et al. | 455/559 |
| 5,732,074 | A | * | 3/1998 | Spaur et al. | 370/313 |
| 5,880,732 | A | * | 3/1999 | Tryding | 715/810 |
| 6,128,482 | A | * | 10/2000 | Nixon et al. | 455/414 |
| 6,167,255 | A | * | 12/2000 | Kennedy et al. | 455/414 |
| 6,301,471 | B1 | * | 10/2001 | Dahm et al. | 455/405 |
| 6,401,085 | B1 | * | 6/2002 | Gershman et al. | 707/4 |
| 6,594,395 | B1 | * | 7/2003 | Forchheimer et al. | 382/236 |
| 2002/0019984 | A1 | * | 2/2002 | Rakib | 725/111 |

FOREIGN PATENT DOCUMENTS

WO    WO 98/56197    12/1998

OTHER PUBLICATIONS

Microsoft Press Computer Dictionary, third edition.*
Gneiting, S., "WAP-Angebote per Handy", Funkschau, Franzisverlag K.G. Munchen, DE, vol. 72, No. 8, Apr. 1, 1999, pp. 28-32. (translation not available).

* cited by examiner

*Primary Examiner*—Tung Vo
*Assistant Examiner*—Behroz Senfi
(74) *Attorney, Agent, or Firm*—Hollingsworth & Funk, LLC

(57) ABSTRACT

A system for facilitating processing of data to and from the data bus of the mobile terminal. The system includes a mobile terminal comprising a data bus for receiving and transmitting data to a wireless communication network. The system further includes an output device for presenting at least one of audio, video, and textual information to a user, and an interface module connected to the data bus of the mobile terminal. The interface module includes: (a) a protocol stack for processing data to and from the data bus of the mobile terminal in accordance with at least one communication protocol, (2) a user agent for interpreting data to and from the protocol stack; and (3) a signal generator for converting the interpreted data from the user agent into signals for presentation by the output device.

19 Claims, 2 Drawing Sheets

WIRELESS APPLICATION PROTOCOL TELEVISION

BACKGROUND OF THE INVENTION

1. Field of the Invention

The present invention relates to data services in a wireless communication network and, more particularly, to a method and an apparatus for processing and presenting data from a mobile terminal on a television monitor.

2. Description of the Related Art

Demands for data service over wireless communication networks have been steadily increasing, as users of mobile phones are no longer satisfied with making only voice calls. Due to their physical constraints, mobile phones are provided with limited display screen surface, input keys, memory, processing power, and battery power. Consequently, their ability to receive, transmit and display data messages is limited.

Various prior art solutions have been devised to overcome these shortcomings. For example, the GSM system provides a service known as the Short Messaging Service (SMS) that allows its subscribers to receive and transmit short data messages (e.g., less than about 100 octets of bits) using their mobile terminals. The data messages are stored in a central location, i.e., the Short Message Service Center (SMSC), to buffer messages. More recently, the Wireless Application Protocol (WAP) has been developed to provide advanced data services to mobile users. These WAP services include, for example, online banking, electronic shopping, access to corporate database, stock trading and games, etc.

Since WAP is a recent development, the percentage of WAP-enabled mobile terminals in use is small as compared to that of older, non-WAP enabled phones (e.g., Nokia models 21xx, 31xx, 51xx and 61xx). As a result, the customer base for WAP data services is relatively small, and service providers are reluctant to create more WAP services. However, the customer base can be increased more efficiently by enabling users of non-WAP-enable terminals to have access to WAP services, thereby accelerating the development of more and varied WAP services. In addition, there are customer groups, e.g. people with impared vision who are not able to use ordinary mobile phones. For them, this kind of TV based user interface would be very valuable.

SUMMARY OF THE INVENTION

An object of the present invention is to provide a method and an apparatus for enabling a user of a mobile terminal to access data services using a display device having a large screen relative to that of the mobile terminal.

According to one aspect of the invention, the mobile terminal is connected to an interface module configured to receive data through the mobile terminal. The interface module converts the data into a format that can be displayed on a conventional television screen. An advantage of using a conventional television screen is that greater textual and graphical information can be displayed to the user, as compared to the display of the mobile terminal. The interface module may also receive input data from a user and transmit the input data to a service provider through the mobile terminal. The user may input data using a wireless input device.

According to another aspect of the invention, the interface module connects to a data bus of the mobile terminal so that data may be received or transmitted through the mobile terminal. The interface module includes a user agent (e.g., a Web browser) for presenting the data on a television screen.

In one embodiment, a system for facilitating processing of data to and from the data bus of the mobile terminal includes a mobile terminal comprising a data bus for receiving and transmitting data to a wireless communication network. The system further includes an output device for presenting at least one of audio, video, and textual information to a user, and an interface module connected to the data bus of the mobile terminal. The interface module includes: (a) a protocol stack for processing data to and from the data bus of the mobile terminal in accordance with at least one communication protocol, (2) a user agent for interpreting data to and from the protocol stack; and (3) a signal generator for converting the interpreted data from the user agent into signals for the output device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements.

DETAILED DESCRIPTION OF THE PRESENTLY PREFERRED EMBODIMENTS

Figure 1:
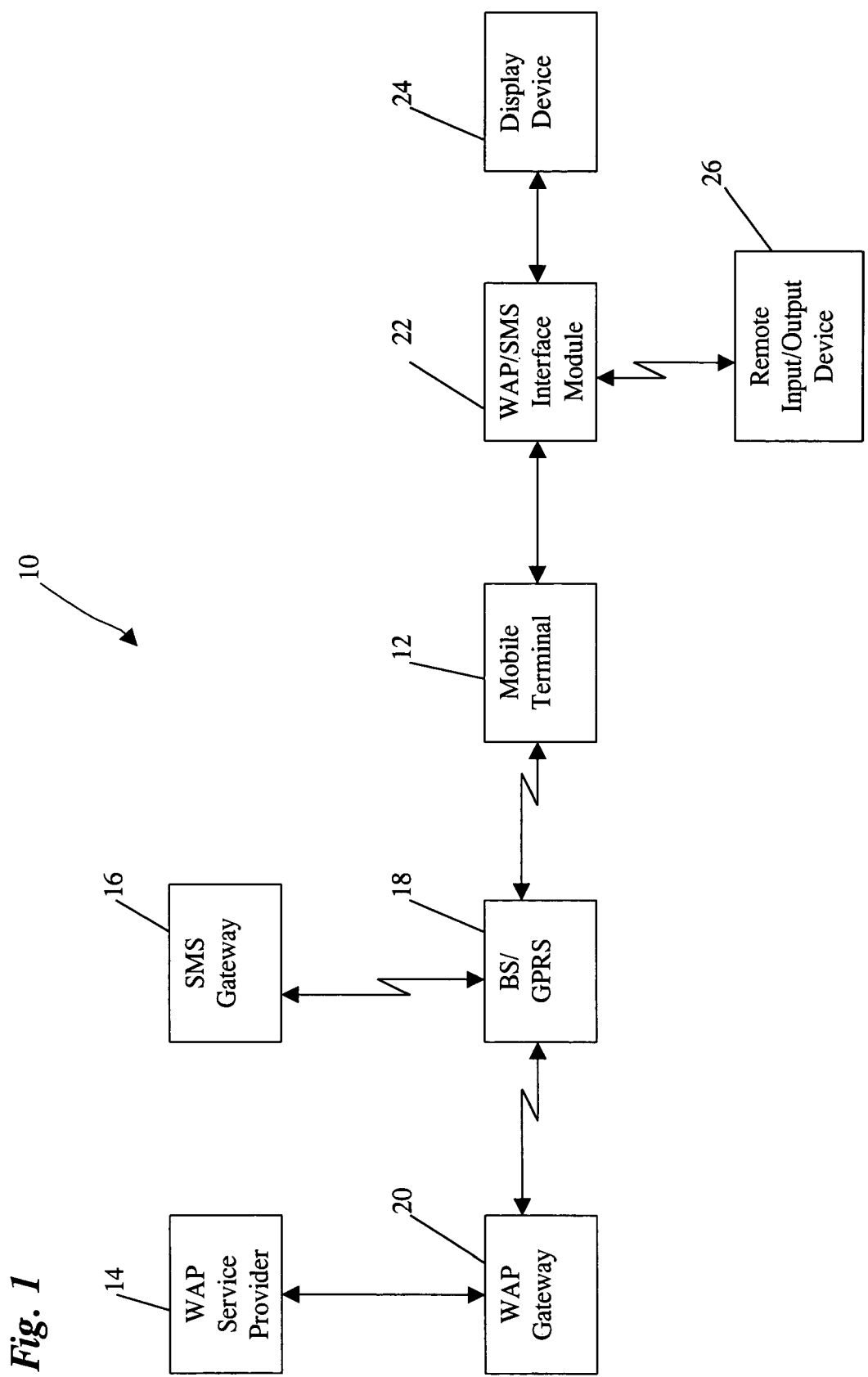
FIG. 1 illustrates a system for presenting audio-video information from a WAP service provider on a television monitor in accordance with an embodiment of the present invention.

FIG. 1 illustrates a system 10 for data transmission between a mobile terminal 12 and a data service provider such as, for example, a Wireless Application Protocol (WAP) service provider 14 or a Short Message Service (SMS) gateway 16. A base station (BS) 18 (which may include, for example, a General Packet Radio Service (GPRS) node) communicates with the mobile terminal 12 and the WAP gateway 20 and/or the SMS gateway 16 through a wireless communication network. The mobile terminal 12 is connected to an interface module 22 for processing data from the mobile terminal 12. A display device 24 (e.g. a television or computer monitor) connected to the interface module 22 for presenting textual, audio and/or video data received from the service provider through the mobile terminal 12. A remote input device 26, preferably a wireless device (e.g., a keyboard), transmits user input data to the interface module 22 using, for example, Blue-Tooth™ technology (i.e., low power radio devices) or infrared rays. It is contemplated that the input device 26 may be connected directly to the interface module 22 or indirectly through the display device 24. It is also contemplated that input device 26 may be hard-wired to the interface module 22.

Figure 2:
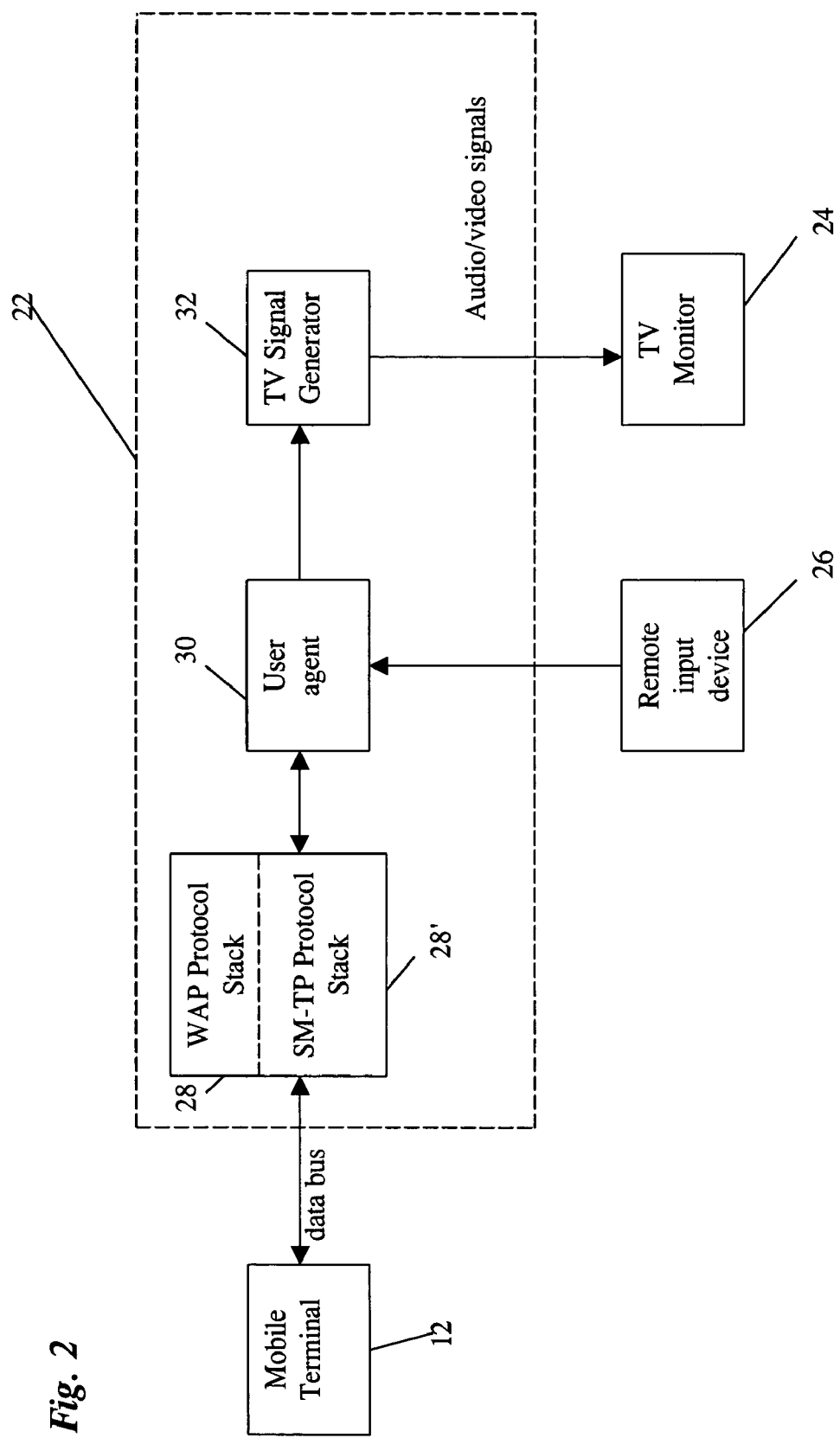
FIG. 2 diagrammatically illustrates the various functions of the interface module of FIG. 1.

As illustrated in FIG. 2, the interface module 22 is connected to the mobile terminal 12 through a data bus. So connected, the interface module 22 may control transmission of data to and from the mobile terminal 12. The interface module 22 preferably includes the following functionality (or sub-modules) for data processing: (1) WAP protocol stack 28 for processing WAP encoded data (e.g., exchange of data objects) to and from a data service provider, (2) Short Message-Transport Protocol (SM-TP) protocol stack 28' for communicating short textual messages to and from a Short Message Service Center (e.g., SMS gateway), (3) a user agent 30 for interpreting or decoding the WAP data and/or SM-TP data, and (4) a signal generator 32 for converting the decoded data from the user agent 30 and generating signals (e.g. TV signals) formatted for presentation on the display device 24. The interface module 22 may also be configured to supply electrical current to a rechargeable battery of the mobile terminal 12 so that the mobile terminal's battery can be recharged while the mobile terminal 12 is connected to the interface module 22.

The interface module 22 may access user or subscriber specific data such as user agent profile information that indicates, for example, WAP capability of the mobile terminal 12 and subscription information of the user. The user or subscriber specific data may be stored in a memory device hard-wired to the interface module 22 or in a removable subscriber identity module (SIM) connected to the interface module 22.

In operation, a user connects the data bus of the mobile terminal 12 to the interface module 22. When the mobile terminal 12 is powered on, the interface module 22 transmits user agent profile information to the WAP gateway 20 through the mobile terminal 12. The WAP gateway 20 receives the user agent profile information and takes note of the WAP capability of the mobile terminal 12 so that appropriate WAP content may be transmitted thereto. The user, using the wireless input device 26, inputs a command requesting service from an identified WAP service provider 14 (e.g., a HyperText Markup Language (HTML) document from a Web site of an electronic bank). The request is encoded as, for example, a Uniform Resource Locator (URL) request by the interface module 22 and then sent to the WAP gateway 20. The WAP gateway 20 decodes and transmits the request to the WAP service provider 14. The WAP service provider 14, upon receipt of the request, transmits, for example, a form document (e.g., one that requires the user to input a personal access number prior to accessing his/her electronic bank account) to the WAP gateway 20. The WAP gateway 20 encodes the form document in, for example, Wireless Markup Language (WML) format (as indicated by the user agent profile) and transmits it to the mobile terminal 12. The interface module 22, through the data bus of the mobile terminal 12, receives the WML encoded data and processes it using one of the layers in the WAP protocol stack 28. The user agent 30 interprets the data and sends the interpreted data to the signal generator 32. The signal generator 32 converts the interpreted data to signals formatted for the display device 24 then displays the form document on the television monitor. The displayed document requests the user to input his/her access number and the user then enters a personal access number using the remote input device 26. The interface module 22, through the user agent 30, receives the access number, encodes it in WML format for transmission to the WAP gateway 20 through the Mbus of the mobile terminal 12. The WAP gateway 20 decodes the data from the mobile terminal 12 and sends it to the WAP service provider 14. Further transmission of data between the WAP service provider 14 and the interface module 22 proceed in the manner described above.

In the case where the SMS gateway 16 transmits a data message to the mobile terminal 12, the interface module 22 receives the data message through the data bus of the mobile terminal 12 and processes it using the Short Message Transport Protocol (SM-TP). The data message is then sent to the user agent 30 and signal generator 32 for processing, and displayed on the television monitor 24. The user can also send an SMS response message by manipulating the alphanumeric keys on the wireless input device 26. The user agent 30 receives the input data string (i.e., the SMS response message) from the user input device 26 and sends the response message to the SMS gateway 16 through the data bus of the mobile terminal 12.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for the processing of data to and from a mobile terminal comprising:
 a mobile terminal comprising a data bus for receiving and transmitting data to a wireless communication network;
 an output device remotely located from the mobile terminal for presenting at least one of audio, video, and textual information to a user; and
 an interface module remotely located from the mobile terminal and arranged for user-initiated coupling to the mobile terminal to interface the data bus of the mobile terminal and the remotely located output device, the interface module comprising:
  a protocol stack for processing data to and from the data bus of the mobile terminal in accordance with at least one communication protocol;
  a user agent for decoding data to and from the protocol stack; and
  a signal generator for converting the decoded data from the user agent into signals formatted for processing by the output device so that the output device presents at least one of audio, video, and textual information to the user based on the signals;
 wherein the interface module determines whether the mobile terminal is configured to display the received data; and
 wherein the decoded data is displayed on the remote output device if the mobile terminal is not configured to display the received data.

2. The system of claim 1, further comprising:
 a user input device, manipulable by the user, for inputting data to the user agent for transmission through the mobile terminal.

3. The system of claim 1, wherein the protocol stack includes the Wireless Application Protocol.

4. The system of claim 3, wherein the protocol stack includes the Short Message Transport Protocol.

5. The system of claim 4, wherein the user agent is a Web browser.

6. The system of claim 5, wherein the browser is configured to interpret data in accordance with one of the Wireless Application Protocol and the Short Message Transport Protocol.

7. The system of claim 1, wherein the output device is a monitor.

8. A method of presenting data transmitted to and from a data bus of a mobile terminal using an interface module, comprising:
 (a) processing data from a data bus of the mobile terminal in accordance with at least one communication protocol;
 (b) decoding the processed data using a user agent and outputting the decoded data to an output device remotely located from the mobile terminal;
 (c) converting the decoded data from the user agent into signals for presentation by the output device; and
 (d) presenting information based on the signals by the output device;
 wherein the interface module is remotely located from the mobile terminal and determines whether the mobile terminal is configured to display the received data; and
 wherein the decoded data is displayed on the remote output device if the mobile terminal is not configured to display the received data.

9. The method of claim 8, wherein the output device presents the converted decoded data on a monitor display screen.

10. The method of claim 8, further comprising the step of:
 (e) receiving user input data by the user agent for transmission by the mobile terminal.

11. The method of claim 8, wherein the at least one communication protocol conforms to the Wireless Application Protocol.

12. The method of claim 8, wherein the at least one protocol conforms to the Short Message Transfer Protocol.

13. The method of claim 8, wherein the user agent is configured as a Web browser.

14. A system for transmitting data between a mobile terminal and an output device comprising:
 a mobile terminal comprising a screen and a data bus for receiving and transmitting data to a wireless communication network;
 an output device having a large screen relative to that of the mobile terminal for presenting at least one of audio, video, and textual information to a user, said output device being remotely located from the mobile terminal; and
 an interface module remotely located from the mobile terminal and arranged for user-initiated coupling to the data bus of the mobile terminal and to the remotely located output device, the interface module comprising:
  a protocol stack for processing data to and from the data bus of the mobile terminal in accordance with at least one communication protocol;
  a user agent for decoding data to and from the protocol stack; and
  a signal generator for converting the decoded data from the user agent into signals formatted for processing by the output device so that the output device presents at least one of audio, video, and textual information to the user based on the signals;
 wherein the interface module determines whether the mobile terminal is configured to display the received data; and
 wherein the decoded data is displayed on the remote output device if the mobile terminal is not configured to display the received data.

15. A method of using an interface module to present data transmitted from a data bus of a mobile terminal on an output device having a large screen relative to that of the screen of the mobile terminal, comprising the steps of:
 processing data from a data bus of the mobile terminal in accordance with at least one communication protocol;
 decoding the processed data using a user agent and outputting the decoded data;
 converting the decoded data from the user agent into signals for presentation by an output device remotely located from the mobile terminal;
 presenting information based on the signals by the remotely located output device;
 determining whether the mobile terminal is configured to display the received data; and
 displaying the decoded data on the remotely located output device if the mobile terminal is not configured to display the received data.

16. The system of claim 1, wherein the output device comprises a television monitor.

17. The method of claim 8, wherein the output device comprises a television monitor.

18. The system of claim 14, wherein the output device comprises a television monitor.

19. The method of claim 15, wherein the output device comprises a television monitor.

* * * * *